US007548288B2

(12) United States Patent
Kim et al.

(10) Patent No.: US 7,548,288 B2
(45) Date of Patent: Jun. 16, 2009

(54) THIN FILM TRANSISTOR ARRAY PANEL AND DISPLAY DEVICE HAVING PARTICULAR DATA LINES AND PIXEL ARRANGEMENT

(75) Inventors: Sung-Man Kim, Seoul (KR);
Seong-Young Lee, Seoul (KR);
Beom-Jun Kim, Seoul (KR); Seung Hwan Moon, Gyeonggi-do (KR);
Hyang-Shik Kong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 613 days.

(21) Appl. No.: 11/312,680

(22) Filed: Dec. 19, 2005

(65) Prior Publication Data

US 2006/0164350 A1 Jul. 27, 2006

(30) Foreign Application Priority Data

Dec. 20, 2004 (KR) .................. 10-2004-0109041

(51) Int. Cl.
*G02F 1/1333* (2006.01)
*G02F 1/1343* (2006.01)
*G09G 3/36* (2006.01)

(52) U.S. Cl. ............... 349/84; 349/149; 345/104
(58) Field of Classification Search .............. 349/84, 349/147, 149; 345/87, 98, 104
See application file for complete search history.

(56) References Cited

U.S. PATENT DOCUMENTS

| 5,040,875 | A | * | 8/1991 | Noguchi | 349/143 |
| 5,151,689 | A | * | 9/1992 | Kabuto et al. | 345/103 |
| 6,172,729 | B1 | * | 1/2001 | Ikeda | 349/145 |
| 6,236,383 | B1 | * | 5/2001 | Nakajima et al. | 345/87 |
| 6,456,013 | B1 | * | 9/2002 | Komiya et al. | 315/169.1 |
| 6,462,799 | B2 | * | 10/2002 | Ohta et al. | 349/141 |
| 6,552,707 | B1 | * | 4/2003 | Fujiyoshi | 345/98 |
| 6,850,294 | B2 | * | 2/2005 | Roh et al. | 349/106 |

FOREIGN PATENT DOCUMENTS

JP 06088967 A * 3/1994

* cited by examiner

*Primary Examiner*—Mike Qi
(74) *Attorney, Agent, or Firm*—Haynes and Boone, LLP.

(57) ABSTRACT

Disclosed is a thin film transistor array panel. The panel includes a plurality of pixels arranged in the form of a matrix each with a pixel electrode and a switching element connected to the pixel electrode, and a plurality of gate lines connected to the switching elements and extending in the row direction. A pair of the gate lines are connected to pixels in each pixel row. A plurality of data lines are connected to the switching elements, and elongated in the column direction. Each data line is provided between two columns of the pixels. The respective data lines are horizontally bent between the two adjacent gate lines, and vertically extend between the two pixel rows.

37 Claims, 7 Drawing Sheets

THIN FILM TRANSISTOR ARRAY PANEL AND DISPLAY DEVICE HAVING PARTICULAR DATA LINES AND PIXEL ARRANGEMENT

BACKGROUND OF THE INVENTION (a) Field of the Invention

The present invention relates to a thin film transistor array panel, and a display device.

(b) Description of the Related Art

Generally, a liquid crystal display (LCD) includes two panels with pixel electrodes and a common electrode, and a liquid crystal (LC) layer disposed between the two panels with a dielectric anisotropy. The pixel electrodes are arranged in the form of a matrix, and connected to switching elements such as thin film transistors (TFTs) to sequentially receive data voltages per the respective rows. The common electrode is formed on the entire surface of the panel to receive a common voltage. From the circuit perspective, the pixel and the common electrodes and the LC layer disposed between those electrodes form an LC capacitor, which basically forms a pixel together with a switching element connected thereto.

Voltages are applied to the two electrodes to form an electric field at the LC layer, and the transmittance of the light passing the LC layer is controlled by varying the intensity of the electric field to thereby display the desired images. In order to prevent the LC layer from being deteriorated due to the long-termed application of the one-directional electric field, the polarity of the data voltage with respect to the common voltage is inverted per the respective frames, rows or pixels.

In the case where the polarity of the data voltage is inverted per the respective pixels (referred to hereinafter as the "dot inversion"), vertical flickers or vertical crosstalks generated due to the kickback voltage are reduced to thereby enhance the display image quality. However, as the polarity of the data voltage is inverted per predetermined rows and columns, the operation of the application of the data voltage to the data lines becomes complicated, and the problematic signal delay of the data lines becomes serious. Accordingly, in order to reduce the signal delay, the processing steps are complicated, including the step of forming data lines with a low resistance material, and the production cost is increased.

By contrast, in the case where the polarity of the data voltage is inverted per predetermined columns (referred to hereinafter as the "column inversion"), the polarity of the data voltage flown through the data line is inverted per the respective frames, and hence, the problematic signal delay of the data line is significantly reduced.

However, as the column inversion does not involve the advantage of the dot inversion, the display image quality of the LCD is deteriorated due to the vertical flickers and the vertical cross-talks.

The LCD further includes gate lines for transmitting gate signals to control the switching elements, data lines for transmitting the data voltages to be applied to electric field generating electrodes, and gate and data drivers for generating the gate signals and the data voltages. The gate and the data drivers are usually formed with a plurality of driving integrated circuit chips, and the number of the chips should be reduced as many as possible to decrease the production cost. Particularly, the data driving integrated circuit chips involve higher cost compared to the gate driving circuit chips, and hence, it is advantageous to reduce the number of the chips.

SUMMARY OF THE INVENTION

The present invention provides a display device which decreases the production cost by reducing the number of driving circuit chips.

The present invention provides a display device which involves enhanced display image quality.

The present invention provides a display device which involves enhanced pixel aperture ratio.

According to an embodiment of the present invention, a thin film transistor array panel is provided with the following features.

According to one aspect of the present invention, the thin film transistor array panel includes a plurality of pixels arranged in the form of a matrix each with a pixel electrode and a switching element connected to the pixel electrode, and a plurality of pairs of gate lines connected to the switching elements and extending in the row direction. Each pair of gate lines is connected to switching elements in a pixel row. A plurality of data lines are connected to the switching elements, and extend in the column direction. Each data line is connected to the switching elements of the pixels in at least two adjacent pixel columns. The respective data lines are horizontally bent between the two adjacent gate lines associated with two adjacent pixel rows.

According to another aspect of the present invention, the thin film transistor array panel includes a plurality of pixels arranged in the form of a matrix each with a pixel electrode and a switching element connected to the pixel electrode, and a plurality of pairs of gate lines connected to the switching elements and extending in the row direction. Each pair of gate lines is connected to switching elements in a pixel row. A plurality of data lines are connected to the switching elements, and extend in the column direction. The data line is connected to the switching elements of the pixels in at least two adjacent pixel columns. The respective data lines are diagonally elongated.

The respective data lines are bent and elongated between the two adjacent gate lines in a first horizontal direction, and vertically extend between the two adjacent pixel columns, followed by being bent and elongated between the two adjacent gate lines in a second horizontal direction. In this case, it is preferable that the first horizontal direction should be opposite to the second horizontal direction.

The respective data lines have an extension pattern repeated per two rows of the pixels, or per three rows of the pixels.

The respective data lines may be extended in the first horizontal direction or in the second horizontal direction by at least one pixel.

The two pixels adjacent to each other in the row direction may be connected to the same data line, and the switching elements of the two pixels adjacent to each other in the row direction may be located opposite to each other with respect to the pixel electrode.

The two pixels arranged between the two adjacent data lines in the row direction ("the pixels as a unit pixel pair") may be connected to different data lines, and the pixels of the unit pixel pair may be connected to different gate lines.

The relative locations of the switching elements of the two unit pixel pairs adjacent to each other in the row direction may be identical with each other.

The pixels of the unit pixel pair may be connected to the same gate line, or the switching elements of the two unit pixel pairs adjacent to each other in the row direction may be located opposite to each other with respect to the pixel electrode.

The switching elements of the two pixels adjacent to each other in the column direction may be located opposite to each other with respect to the pixel electrode.

The respective data lines may be elongated in a first diagonal direction, followed by vertically extending between the two pixel columns, and elongated in a second diagonal direction. It is preferable that the first diagonal direction should be opposite to the second diagonal direction. In this case, the first diagonal direction or the second diagonal direction may be angled at 10-80° with respect to a line proceeding vertical to the gate line.

The respective data lines may be elongated in the first diagonal direction or in the second diagonal direction by at least one pixel.

According to still another aspect of the present invention, the display device includes a plurality of pixels arranged in the form of a matrix each with a pixel electrode and a switching element connected to the pixel electrode, and a plurality of pairs of gate lines connected to the switching elements and extending in the row direction. Each pair of the gate lines are connected to switching elements in a pixel row. A plurality of data lines are connected to the switching elements via terminal lines, and extend in the column direction. The data line is connected to the switching elements of the pixels in at least two adjacent pixel columns. The respective data lines are horizontally bent between the two adjacent gate lines. The polarities of the data voltages flowing through the adjacent data lines are opposite to each other. With the apparent inversion of the pixels, the polarity types of the pixels are altered per a plurality of the pixel columns.

According to still another aspect of the present invention, the display device includes a plurality of pixels arranged in the form of a matrix each with a pixel electrode and a switching element connected to the pixel electrode, and a plurality of pair of gate lines connected to the switching elements and extending in the row direction. Each pair of the gate lines are connected to switching elements in a pixel row. A plurality of data lines are connected to the switching elements via terminal lines, and extend in the column direction. The data line is connected to the switching elements of the pixels in at least two adjacent pixel columns. The respective data lines are diagonally elongated and the polarities of the data voltages flowing through the adjacent data lines are opposite to each other. With the apparent inversion of the pixels, the polarity types of the pixels are altered per a plurality of the pixel columns.

With the apparent inversion of the pixels, it is preferable that the polarity types should be altered per four of the pixel columns. With the apparent inversion of the pixels, a positive (+) polarity column, a first mixed polarity column, a negative (−) polarity column and a second mixed polarity column may be repeated alternately. In this case, it is preferable that the negative polarity and the positive polarity should alternate in the column direction, and the first mixed polarity column should have polarities opposite to the second mixed polarity column.

BRIEF DESCRIPTION OF THE DRAWINGS

The present invention will become more apparent by describing embodiments thereof in detail with reference to the accompanying drawings in which.

DETAILED DESCRIPTION OF PREFERRED EMBODIMENTS

Figure 1:
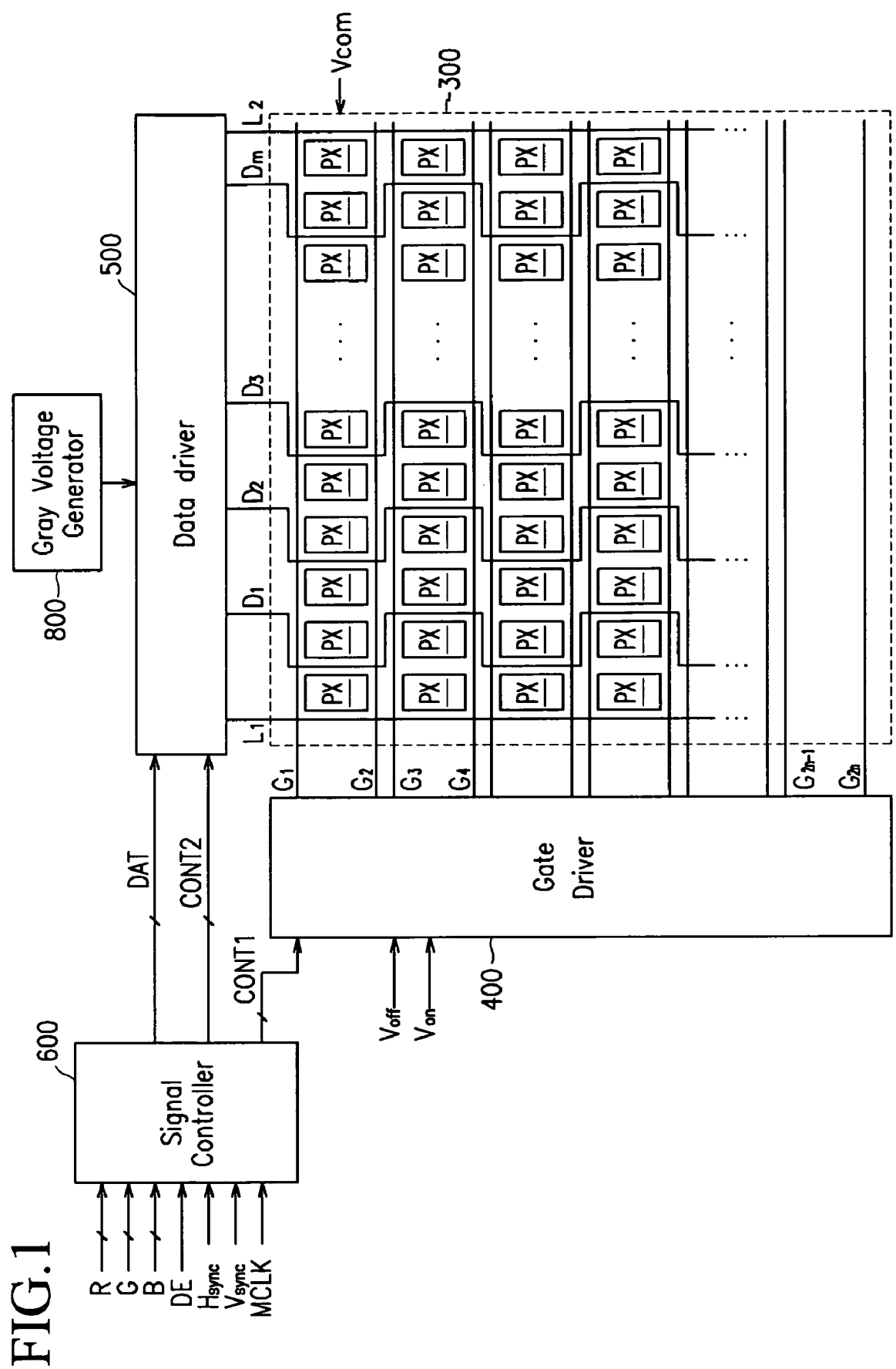
FIG. 1 is a block diagram of an LCD according to an embodiment of the present invention.

The present invention will now be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, thin film transistor array panels and LCDs according to embodiments of the present invention will be specifically explained with reference to the accompanying drawings.

Figure 2:
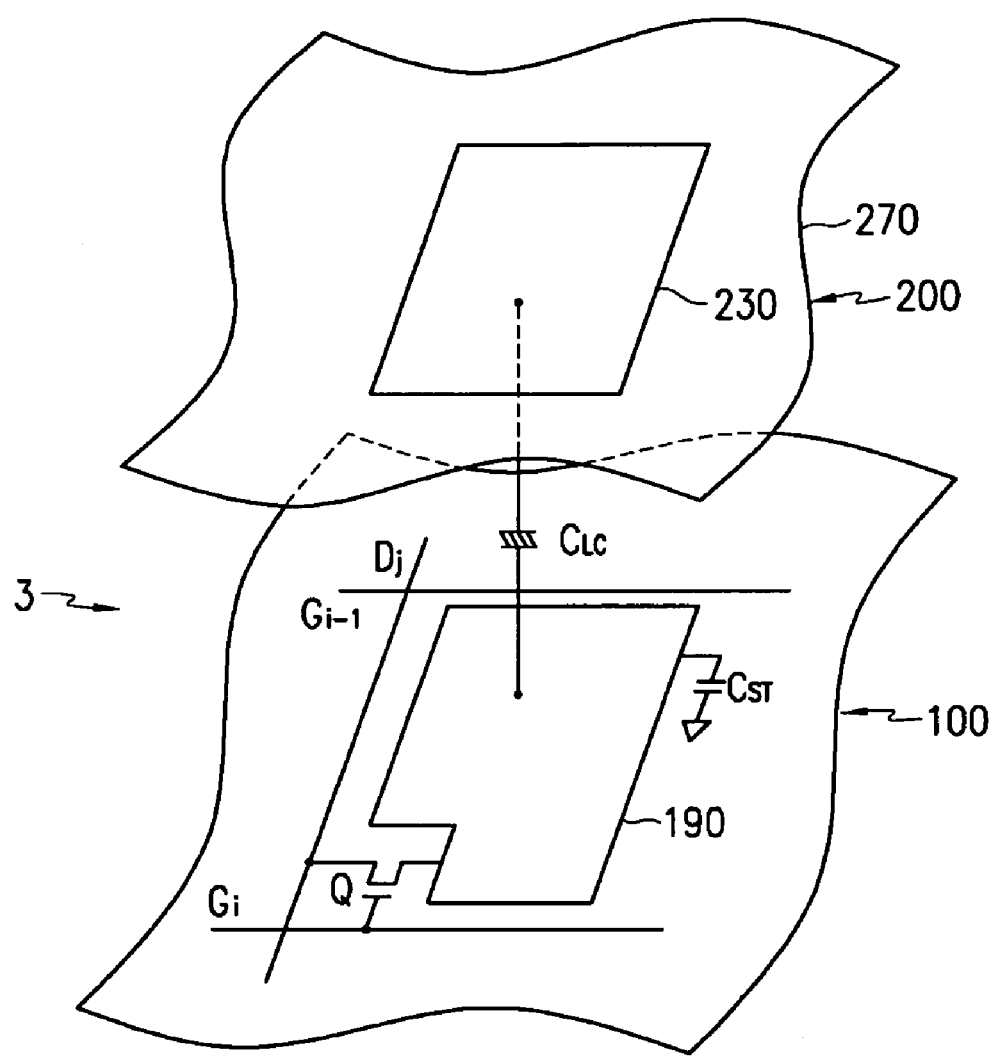
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

As shown in FIG. 1, an LCD according to an embodiment of the present invention includes an LC panel assembly 300, gate and data drivers 400 and 500 connected to the LC panel assembly 300, a gray voltage generator 800 connected to the data driver 500, and a signal controller 600 for controlling them.

From the equivalent circuit perspective, the LC panel assembly 300 includes a plurality of display signal lines $G_1$-$G_{2n}$ and $D_1$-$D_m$, and a plurality of pixels connected to those display signal lines and arranged in the form of a matrix. Furthermore, the LC panel assembly 300 includes upper and lower display panels 100 and 200, and an LC layer 3 disposed between the panels.

The display signal lines $G_1$-$G_{2n}$ and $D_1$-$D_m$ include a plurality of gate lines $G_1$-$G_{2n}$ for transmitting gate signals (also called the "scanning signals"), and data lines $D_1$-$D_m$ for transmitting data signals. The gate lines $G_1$-$G_{2n}$ extend in the direction of rows of the pixels (in the row direction) substantially parallel to each other, and the data lines $D_1$-$D_m$ extend in the direction of columns of the pixels (in the column direction) substantially parallel to each other. As shown in FIG. 1, the display signal lines may include dummy lines L1 and L2 placed at the leftmost and rightmost peripheries of the LC panel assembly 300 and extending in the row direction substantially parallel to the data lines $D_1$-$D_m$.

The respective pixels have a switching element Q connected to the gate and the data lines $G_1$-$G_{2n}$ and $D_1$-$D_m$ and the dummy lines L1 and L2, and an LC capacitor $C_{LC}$ and a storage capacitor $C_{ST}$ connected to the switching element Q. Furthermore, the respective pixels formed around the leftmost and rightmost peripheries of the LC panel assembly 300 include a switching element Q connected to the gate line $G_1$-$G_{2n}$ and the dummy lines L1 and L2 formed at the leftmost and rightmost peripheries of the LC panel assembly 300, and an LC capacitor $C_{LC}$ and a storage capacitor $C_{ST}$ connected to the switching element Q. The storage capacitor $C_{ST}$ may be omitted when needed.

The switching element Q of each pixel is formed with a thin film transistor provided at the lower display panel 100, and has a triode terminal structure with a gate terminal connected to the gate line $G_1$-$G_{2n}$ as a control terminal, a source terminal connected to the data line $D_1$-$D_m$ as an input terminal, and a drain terminal connected to the LC capacitor $C_{LC}$ and the storage capacitor $C_{ST}$ as an output terminal.

The LC capacitor has the pixel electrode 190 of the lower display panel 100 and the common electrode 270 of the upper display panel 200 as two terminals, and the LC layer 3 disposed between the two electrodes 190 and 270 as a dielectric. The pixel electrode 190 is connected to the switching element Q, and the common electrode 270 is formed on the entire surface of the upper display panel 200 to receive a common voltage Vcom. Alternatively, the common electrode 270 may be formed on the lower display panel 100, and in this case, at least one of the two electrodes 190 and 270 may be formed in the shape of a line or a bar.

With the storage capacitor $C_{ST}$ subsidiary to the LC capacitor $C_{LC}$, a separate signal line (not shown) formed on the lower display panel 100 is overlapped with the pixel electrode 190 while interposing an insulator, and a predetermined voltage such as a common voltage Vcom is applied to that signal line. Alternatively, the storage capacitor $C_{ST}$ may be formed by overlapping the pixel electrode 190 with the previous gate line while interposing an insulator.

As shown in FIG. 1, a pair of gate lines $G_1$ and $G_2$, $G_3$ and $G_4$, . . . are arranged over and below one row of the pixels PX. Furthermore, the data lines $D_1$-$D_m$, rather than being a straight vertical line, is formed in a zig-zag shape around alternate columns of pixels. That is, the data lines $D_1$-$D_m$ are extended roughly by one pixel in the right or left direction, and are vertically arranged between the two neighboring pixels PX. That is, one data line is disposed between two pixel columns. As the direction of extension of the data lines $D_1$-$D_m$ extended in the left or right direction is altered at the respective pixel rows, the data lines $D_1$-$D_m$ form a zig-zag shape along the respective pixel column. The data lines $D_1$-$D_m$ disposed at each pixel row have the same shape. The interconnection of the gate lines $G_1$-$G_{2n}$, the data lines $D_1$-$D_m$ and the pixels PX will be more specifically explained later.

Meanwhile, in order to express colors, the respective pixels intrinsically display one of the primary colors (the space division) or alternately display the primary colors (the time division) such that the desired color image is perceived as a spatial or temporal sum of the primary colors. The primary colors may be red, green and blue.

FIG. 2 illustrates an example of the space division where each pixel has a color filter 230 at a region of the upper display panel 200 to express one of the primary colors. As differentiated from the structure shown in FIG. 2, the color filter 230 may be formed over or below the pixel electrode 190 of the lower display panel 100.

A polarizer (not shown) is attached to the outer surface of at least one of the two display panels 100 and 200 of the LC panel assembly 300.

The gray voltage generating unit 800 generates two sets of gray voltages related to the pixel light transmittance. One of the two sets has a positive value with respect to the common voltage Vcom, and the other set has a negative value.

The gate driver 400 is connected to the gate lines $G_1$-$G_{2n}$ of the LC panel assembly 300, and applies gate signals formed with combinations of gate on and gate off voltages Von and Voff from the outside to the gate lines $G_1$-$G_{2n}$. The gate driver 400 may be formed with a plurality of integrated circuits.

The data driver 500 is connected to the data lines $D_1$-$D_m$ and the dummy lines L1 and L2 of the LC panel assembly 300, and selects the gray voltages from the gray voltage generator 800 to apply the selected gray voltages to the pixels as the data voltages.

The gate driver 400 or the data driver 500 is directly mounted on the LC panel assembly 300 in the form of a plurality of driving integrated circuit chips, or attached to the LC panel assembly 300 in the form of a tape carrier package TCP while mounting it on a flexible printed circuit film (not shown). Alternatively, the gate driver 400 or the data driver 500 may be integrated on the LC panel assembly 300 together with the display signal lines $G_1$-$G_{2n}$ and $D_1$-$D_m$ and the thin film transistor switching elements Q.

The signal controller 600 controls the operation of the gate and the data drivers 400 and 500.

The display operation of the LCD will be now explained in detail.

The signal controller 600 receives input color image signals R, G and B and input control signals for controlling the displaying thereof from an external graphic controller (not shown), such as vertical synchronization signals Vsync, horizontal synchronization signals Hsync, main clocks MCLK, and data enable signals DE. The signal controller 600 suitably processes the color image signals R, G and B in conformity with the operation conditions of the LC panel assembly 300, based on the input color image signals R, G and B and the input control signals of the signal controller 600. The signal controller 600 generates gate control signals CONT1 and data control signals CONT2, and transmits the gate control signals CONT1 to the gate driver 400 while transmitting the data control signals CONT2 and the processed color image signals DAT to the data driver 500. The processing of the color image signals R, G and B includes the step of rearranging the color image data R, G and B in accordance with the pixel arrangement of the LC panel assembly 300 shown in FIG. 1.

The gate control signals CONT1 include scanning start signals STV for instructing the gate driver 400 to start the scanning, and at least one clock signal for controlling the output time of the gate on voltage Von. The gate control signals CONT1 may also include output enable signals OE for defining the duration time of the gate on voltages Von.

The data control signals CONT2 include horizontal synchronization start signals STH for informing the data driver 500 of the data transmission to one row of the pixels, load signals LOAD for instructing the data driver 500 to apply the relevant data voltages to the data lines $D_1$-$D_m$, and data clock signals HCLK. The data control signals CONT2 may include reverse signals RVS for inverting the polarity of the data voltage with respect to the common voltage Vcom (referred to hereinafter as the polarity of the data voltage).

The data driver 500 sequentially receives a set of color image data DAT with respect to half the row of pixels in accordance with the data control signals CONT2 from the signal controller 600, and selects the gray voltages corresponding to the respective color image data DAT among the gray voltages from the gray voltage generator 800. In this way, the data driver 500 converts the color image data DAT into suitable analog data voltages, and applies them to the relevant data lines $D_1$-$D_m$.

The gate driver 400 sequentially applies the gate on voltages Von to the gate lines $G_1$-$G_{2n}$ in accordance with the gate control signals CONT1 from the signal controller 600, and turns on the switching elements Q connected to the gate lines $G_1$-$G_{2n}$. Consequently, the data voltages applied to the data lines $D_1$-$D_m$ are applied to the relevant pixels through the turned-on switching elements Q.

The difference between the data voltage and the common voltage Vcom applied to the pixels is represented by the charge voltage of the LC capacitor $C_{LC}$, that is, by the pixel voltage. The liquid crystal molecules are re-oriented depending upon the magnitude of the pixel voltage, and accordingly, the polarization of the light passing the LC layer 3 is varied. The polarization variation is represented by the variation in the light transmittance due to the polarizers (not shown) attached to the display panels 100 and 200.

The data driver 500 and the gate driver 400 repeat the same operation by taking the ½ horizontal cycle, that is, ½ H (where "H" is a cycle of horizontal synchronization signals Hsync) as a unit. In this way, gate on voltages Von are sequentially applied to all the gate lines $G_1$-$G_{2n}$ for a frame, thereby applying the data voltages to all the pixels. When one frame terminates, the next frame starts, and the reverse signals RVS applied to the data driver 500 is controlled such that the polarity of the data voltages applied to the respective pixels is opposite to that used in the previous frame (called the "frame inversion").

In addition to the frame inversion, the data driver 500 inverts the polarity of the data voltages flowing along neighboring data lines $D_1$-$D_m$ within one frame, and accordingly, the polarity of the pixel voltages upon receipt of the data voltages is also varied. In this embodiment, as the interconnections of the pixels PX and the data lines $D_1$-$D_m$ are diversified, the polarity inversion pattern at the data driver 500 and the polarity inversion pattern of the pixel voltages on the screen of the LC panel assembly 300 differ from each other. The inversion at the data driver 500 will be referred to hereinafter as the driver inversion, and the inversion on the screen as the apparent inversion.

An LCD according to an embodiment of the present invention will be now specifically explained with reference to FIG. 3.

Figure 3:
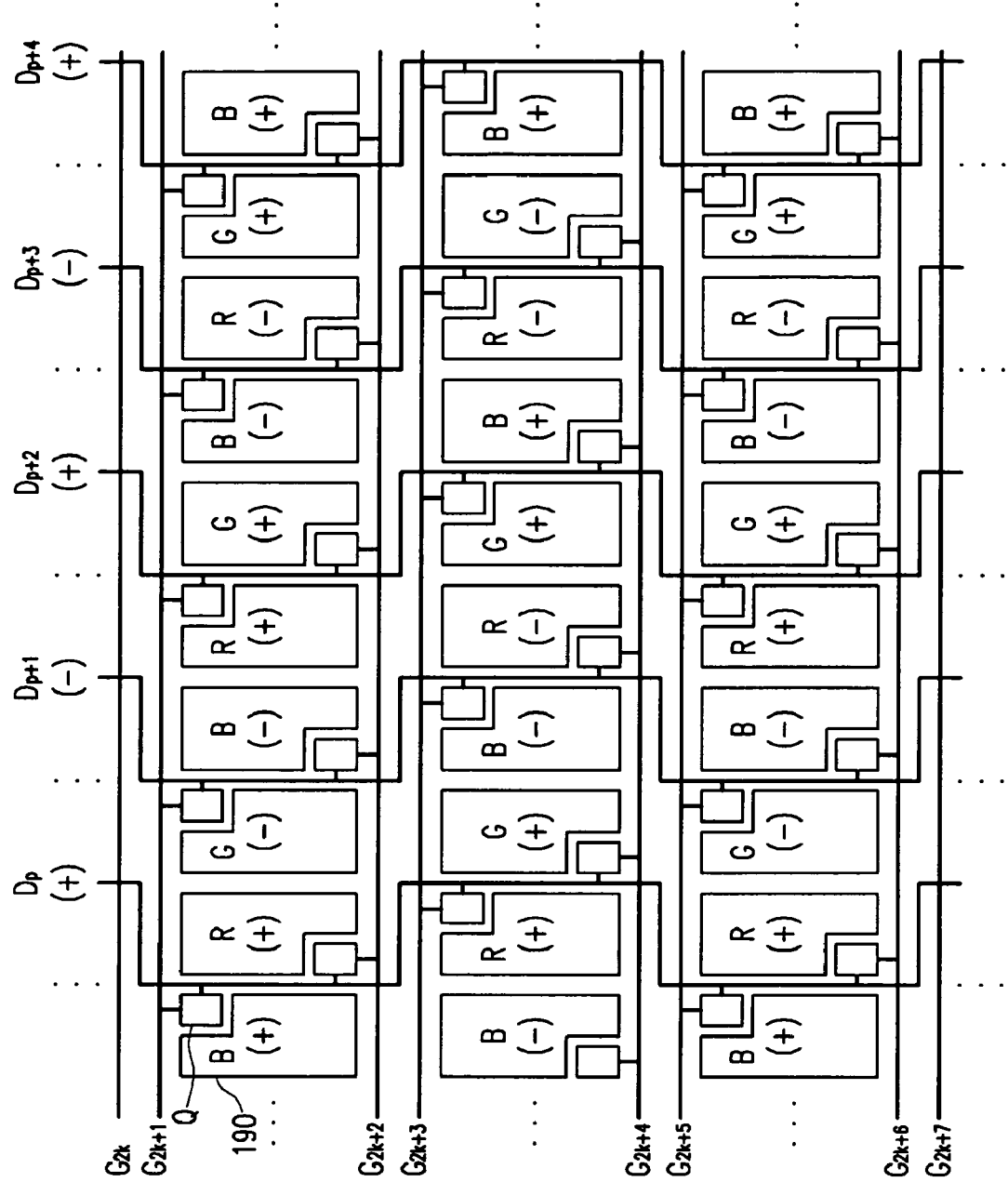
FIG. 3 illustrates an arrangement of pixels according to an embodiment of the present invention.

FIG. 3 illustrates a pixel arrangement of an LCD according to an embodiment of the present invention.

With the pixel arrangement shown in FIG. 3, as explained previously, a pair of gate lines are arrange over and below the pixel electrodes 190 at each row of pixels, and the data lines $D_1$-$D_m$ are arranged between columns of the pixel electrodes 190. Thus, each pixel row is associated with its own pair of gate lines.

Furthermore, each switching element Q connected to a respective pixel electrodes 190 and is placed adjacent a data line $D_p$, $D_{p+1}$, ... is connected to alternate gate lines $G_{2k+1}$ and $G_{2k+2}$ (K=0, 1, 2, ... ). For instance, for the pixel placed left of the data line $D_p$, $D_{p+1}$, ... , the switching element Q is positioned at the upper right side of the pixel electrode, and is connected to the upper-sided gate line $G_{2k+1}$, whereas for the pixel placed right of the data lines $D_p$, $D_{p+1}$, ..., the switching element Q is positioned at the lower left side of the pixel electrode, and connected to the lower-sided gate line $G_{2k+2}$. That is, the switching elements Q are located closest to the data lines $D_p$, $D_{p+1}$, and connected to the data lines $D_p$, $D_{p+1}$, ... directly neighboring thereto.

The switching elements Q of a pair of the pixels (referred to hereinafter as the "unit pixel pair") placed between the data lines $D_p$ and $D_{p+1}$ adjacent to each other in the row direction are connected to different data lines $D_p$ and $D_{p+1}$, and located diagonally opposite to each other with respect to the pixel electrode. The switching elements of the unit pixel pair are connected to different data lines $D_p$ and $D_{p+1}$, and the relative locations of the switching elements Q at the unit pixel pairs adjacent to each other in the row direction are identical with each other.

The locations of the switching elements Q at the two pixels adjacent to each other in the column direction are established to be opposite to each other, but the relative locations of the switching elements at the two unit pixel pairs adjacent to each other in the column direction are identical with each other.

The respective data lines $D_p$, $D_{p+1}$, ... are horizontally elongated roughly by one pixel between the two neighboring gate lines $G_{2k}$ and $G_{2k+1}$ at each pixel row to the left or right, and extends vertically between the two neighboring pixel electrodes 190 to form a zig-zag shape. The data line $D_p$, $D_{p+1}$, ... is again elongated roughly by one pixel between the two neighboring gate lines $G_{2k+2}$ and $G_{2k+3}$ at the next pixel row in the direction opposite to the just previous pixel row to the right or left, and extends vertically between the two neighboring pixel electrodes 190. Such an extension pattern of the respective data lines $D_p$, $D_{p+1}$, ... is repeated per two pixel rows.

In this way, as the data lines are bent and elongated roughly by one pixel between the two neighboring gate lines in a zig-zag manner, and vertically extended, one of the unit pixel pairs at the neighboring pixel rows is shifted to the right or left by one pixel with respect to the other when the pixels thereof are arranged parallel to each other in the row direction. In this case, with the unit pixel pairs, the relative locations of the switching elements at the pixels connected to the same data line $D_p$, $D_{p+1}$, ... are identical with each other.

Figure 4:
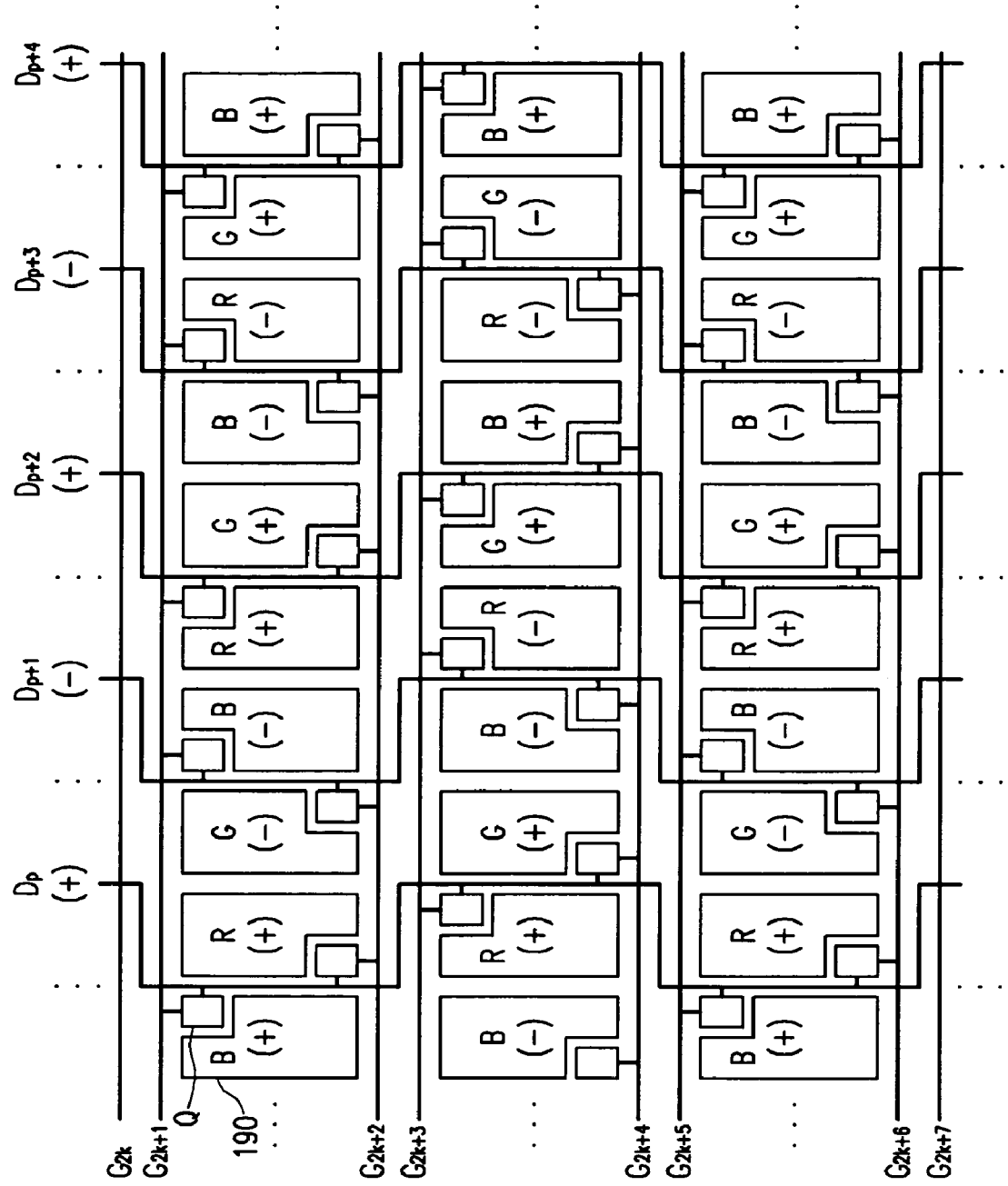
FIG. 4 illustrates another arrangement of pixels according to an embodiment of the present invention.

A pixel arrangement of an LCD according to another embodiment of the present invention will be specifically explained with reference to FIG. 4. FIG. 4 illustrates another pixel arrangement of an LCD according to a second embodiment of the present invention.

The pixel arrangement shown in FIG. 4 is similar to that shown in FIG. 3. That is, a pair of gate lines are arranged over and below the pixel electrodes 190 at each row of pixels, and one data line $D_1$-$D_m$ is provided between the pixel electrodes 190 at two columns of the pixels.

Furthermore, the switching elements of the unit pixel pair are connected to alternate data lines $D_p$ and $D_{p+1}$, and the switching elements Q of the two pixels adjacent to each other in the column direction are located opposite to each other, but the relative locations of the switching elements at the unit pixel pairs adjacent to each other in the column direction are identical with each other.

The respective data lines $D_p$, $D_{p+1}$, ... are bent by one pixel between the two neighboring gate lines in a zig-zag manner, and extend in the vertical direction. With the unit pixel pairs, the relative locations of the switching elements at the pixel connected to the same data line $D_p$, $D_{p+1}$, ... are identical with each other.

By contrast, as shown in FIG. 4, the locations of the switching elements Q at the two neighboring unit pixel pairs on the same pixel row are opposite to each other. That is, the switching elements Q connected to a pair of the pixel electrodes 190 around one data line $D_p$, $D_{p+1}$, ... at a pixel row are connected to the different gate lines $G_{2k+1}$ and $G_{2k+2}$ (k=0, 1, 2, ... ), but the switching elements of the unit pixel pair are connected to the same gate line.

Specifically speaking, with the pixels arranged to the left of the odd-numbered data lines $D_p$, $D_{p+2}$, ... (p=1, 2, ... ), the switching element Q is positioned at the upper right side of the pixel electrode, and connected to the upper-sided gate line $G_{2k+1}$, $G_{2k+3}$, .... With the pixels arranged to the right of the odd-numbered data lines $D_p$, $D_{p+2}$, ..., the switching element Q is positioned at the lower left side of the pixel electrode, and connected to the lower-sided gate line $G_{2k+2}$, $G_{2k+4}$, .... With the pixels arranged to the left of the even-numbered data lines $D_{p+1}$, $D_{p+3}$, ..., the switching element Q is positioned at the lower right side of the pixel, and connected to the lower-sided gate line $G_{2k+2}$, $G_{2k+4}$, .... With the pixels arranged to the right of the even-numbered data lines $D_{p+1}$, $D_{p+3}$, ..., the switching element Q is positioned at the upper left side of the pixel, and connected to the upper-sided gate line $G_{2k+1}$, $G_{2k+3}$, ....

The pixel arrangements shown in FIGS. 3 and 4 are presented each only as an example, and the interconnections of the pixel electrodes 190 at the odd-numbered and even-numbered pixel rows, the data lines $D_1$-$D_m$ and the gate lines $G_1$-$G_{2n}$ may be varied. Furthermore, the respective data lines are horizontally extended roughly by one pixel, but may be extended by two or more pixels.

With the pixel arrangements shown in FIGS. 3 and 4, the switching elements Q are connected to the data lines $D_p$, $D_{p+1}$, ... directly neighboring thereto, and hence, the formation area of the data lines $D_p$, $D_{p+1}$, ... is reduced. Accordingly, the overlapped area of the data lines $D_p$, $D_{p+1}$, ... and the gate lines $G_{2k}$, $G_{2k+1}$, ... is reduced, and hence, the parasitic capacitance of the parasitic capacitor generated therebetween is decreased. Furthermore, the parasitic capacitance between the data line $D_p$, $D_{p+1}$, ... and the LC layer 3 is decreased so that the bad influence thereof with respect to the pixel voltage is prevented.

The distance between the two neighboring pixel electrodes 190 is differentiated between the case where the data lines $D_p$, $D_{p+1}$, ... are present, and the case where they are absent. That is, in order to dispose the data line $D_p$, $D_{p+1}$, ... between the pixel electrodes 190, it is required to obtain an area amounting to the horizontal width or more of the data line $D_p$, $D_{p+1}$, ..., and hence, the regional width of the data line $D_p$, $D_{p+1}$, ... should be larger than the width of the region with no data line.

Due to the width difference between the pixel electrodes 190, the horizontal width of a light interception member (not shown) provided between the pixel electrodes 190 is also differentiated depending upon the presence of the data line, and hence, the display area is differentiated between the pixel with the data line and the pixel with no data line so that defective vertical stripes may be generated.

However, considering the neighboring red and green pixels R and G with the LCD pixel arrangements shown in FIGS. 3 and 4, the case where the data line is present between the two pixels R and G, and the case where the data line is absent therebetween are alternately repeated in the row and column directions. Consequently, the display area difference between the two pixels R and G made due to the presence and absence of the data line is compensated for in the row and column directions, and hence, the defective vertical stripes in the display images are reduced.

Particularly with the case shown in FIG. 4, the switching elements Q of the unit pixel pair are connected to the same gate line so that the pixels of the unit pixel pair are simultaneously driven, and the phenomenon where the charging time to the target voltage is differentiated and the variation in voltages of the charged pixel due to delay charging of the pixel is not generated. Furthermore, as the relative locations of the switching elements Q connected to the data line $D_p$, $D_{p+1}$, ... directly neighboring thereto at the same pixel row are varied, the deterioration in the display image quality made due to the deviation in the parasitic capacitance between the source and the drain terminals of the switching element Q with the misalignment of the mask during the processing is prevented, and a separate pattern is not required to reduce the deviation in the parasitic capacitance so that the pixel aperture ratio is enhanced.

An inversion pattern according to an embodiment of the present invention will be now specifically explained with reference to FIGS. 3 and 4.

The drive inversion shown in FIGS. 3 and 4 is a column inversion where the data voltages flown through one data line always have the same polarity, and the data voltages flown through the two neighboring data lines have polarities opposite to each other.

With the cases shown in FIGS. 3 and 4, four polarity types with a positive (+) polarity column, a first mixed polarity column where the negative (−) and the positive are alternately arranged in the column direction, a negative polarity column, a second mixed polarity column where the positive and the negative are alternately arranged in the column direction are sequentially repeated. As shown in FIGS. 3 and 4, the first and the second mixed polarity columns have polarity patterns opposite to each other. With such inversion patterns, the negative and the positive polarity columns are mixed with each other so that they are perceived as a polarity mixture, and hence, the luminance difference made due to the kickback voltage between the case where the pixel voltage is positive and the case where it is negative is diffused, thereby reducing the defective vertical stripes.

An LCD according to another embodiment of the present invention will be now specifically explained with reference to the drawings.

Figure 5:
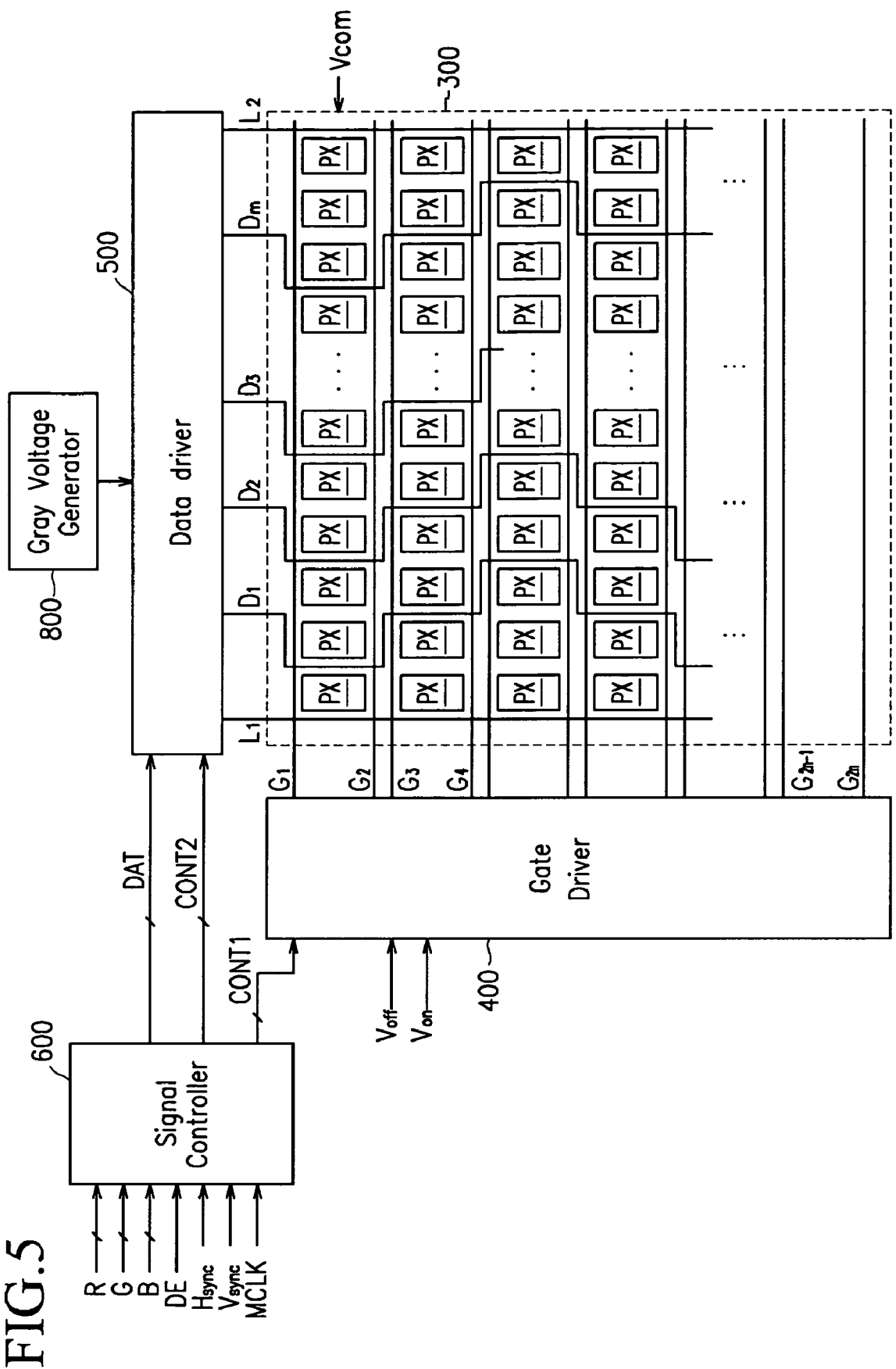
FIG. 5 is a block diagram of an LCD according to another embodiment of the present invention.
Figure 6:
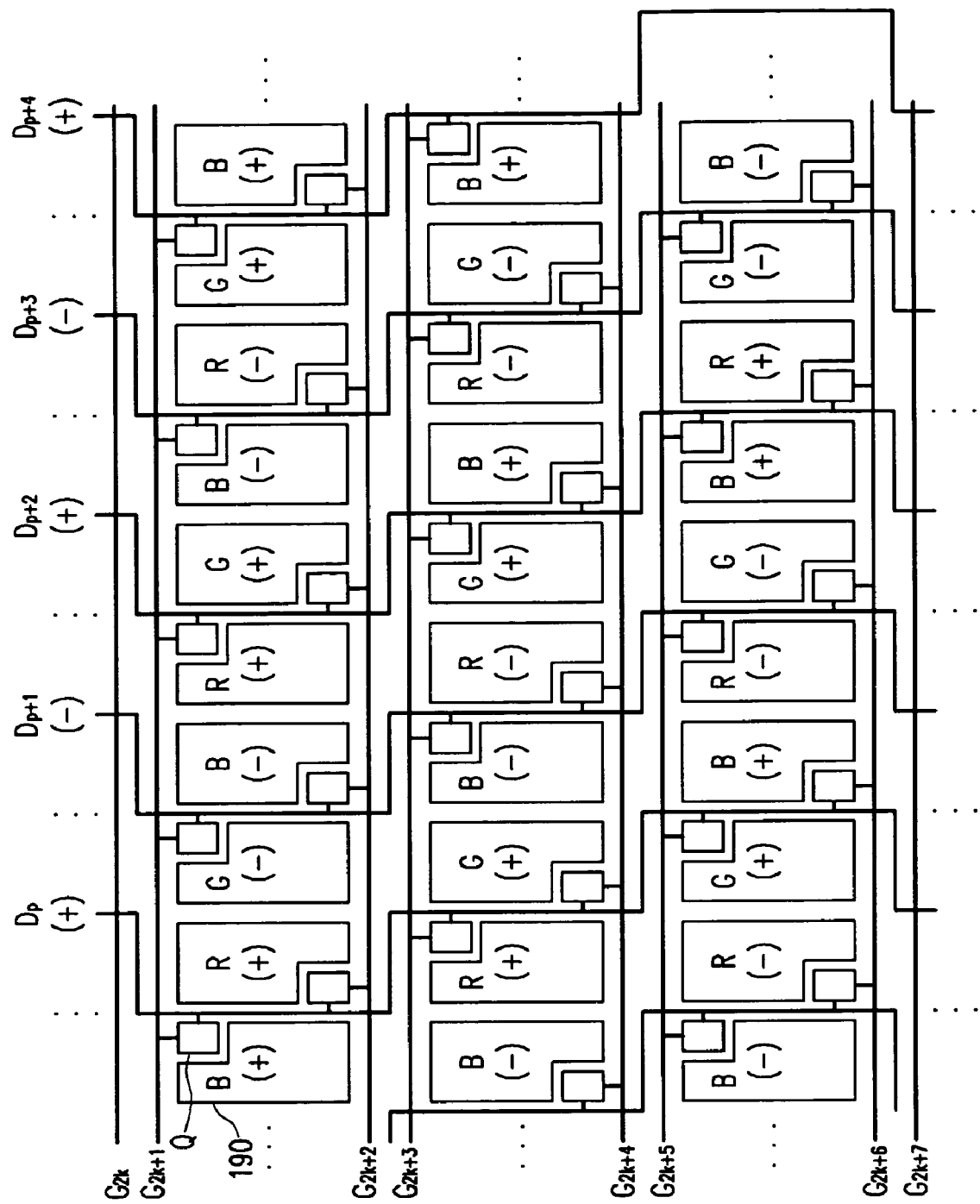
FIG. 6 illustrates an arrangement of pixels according to another embodiment of the present invention.

FIG. 5 is a block diagram of an LCD according to another embodiment of the present invention, and FIG. 6 illustrates a pixel arrangement of an LCD according to another embodiment of the present invention.

As shown in FIG. 5, the structure of an LCD according to another embodiment of the present invention is nearly similar to the structure of the LCD shown in FIG. 1 according to the previous embodiment. That is, the LCD includes an LC panel assembly 300, and gate and data drivers 400 and 500 connected to the assembly 300, a gray voltage generator 800 connected to the data driver 500, and a signal generator 600 for controlling them. The operation of the LCD is the same as that of the LCD shown in FIG. 1, and explanation thereof will be omitted. However, as shown in FIG. 5, the pixel arrangement of the LCD is like that shown in FIG. 6.

The pixel arrangement of an LCD according to another embodiment of the present invention will be now specifically explained with reference to FIG. 6. FIG. 6 illustrates a pixel arrangement of an LCD according to another embodiment of the present invention.

The pixel arrangement shown in FIG. 6 is similar to that shown in FIG. 3.

That is, a pair of gate lines is arranged over and below the pixel electrodes 190 at each row of pixels, and data lines $D_1$-$D_m$ are disposed between columns of pixel electrodes 190. The switching elements Q connected to a pair of the pixel electrodes 190 placed between the data lines $D_p$, $D_{p+1}$, ... at each pixel row are connected to different gate lines $G_{2k+1}$ and $G_{2k+2}$ (k=0, 1, 2, ...) such that the switching elements of the unit pixel pair diagonally face each other.

Furthermore, the switching elements at the unit pixel pair are connected to the different data lines $D_p$ and $D_{p+1}$. Moreover, the switching elements Q at the two pixels neighboring to each other in the column direction are located opposite to each other, but the relative locations of the switching elements Q of the unit pixel pairs neighboring to each other in the row and column directions are identical with each other.

However, as shown in FIG. 6, the data line at a pixel column is bent in the form of a zig-zag as with that shown in FIG. 3, but the extension pattern thereof is repeated per three pixel rows (the repeated pixel row unit).

That is, as shown in FIG. 6, the data line $D_p, D_{p+1}, \ldots$ at the (k+1)th pixel row is bent to the left between the two neighboring gate lines $G_{2k}$ and $G_{2k+1}$, followed by being elongated up to one pixel, and vertically extends between a pair of the pixels. The data line $D_p, D_{p+1}, \ldots$ at the (k+2)th pixel row is bent to the right between the two neighboring gate lines $G_{2k+2}$ and $G_{2k+3}$, followed by being elongated up to one pixel, and vertically extends between a pair of the pixels. The data line $D_p, D_{p+1}, \ldots$ at the (k+3)th pixel row is again bent to the right between the two neighboring gate lines $G_{2k+4}$ and $G_{2k+5}$, followed by being elongated up to one pixel, and vertically extends between a pair of the pixels. The data line $D_p, D_{p+1}, \ldots$ at the (k+4)th pixel row is again bent to the left between the two neighboring gate lines $G_{2k+6}$ and $G_{2k+7}$, followed by being elongated up to one pixel, and vertically extends between a pair of the pixels. That is, the portion of the data line $D_p, D_{p+1}, \ldots$ at the first and the last pixel rows of the repeated pixel row unit is bent to the left, followed by being elongated up to one pixel, and the portion thereof at the intermediate pixel rows is bent to the right, followed by being elongated up to one pixel.

The data line $D_p, D_{p+1}, \ldots$ may be also bent opposite to those directions, and elongated. That is, with the repeated pixel row unit, the portion of the data line $D_p, D_{p+1}, \ldots$ at the first and the last pixel rows is bent to the right, followed by being elongated up to one pixel, and the portion of the data line at the intermediary pixel rows is bent to the left, followed by being elongated up to one pixel. The arrangement shown in FIG. 6 is presented only as an example, and the interconnections of the pixel electrodes 190 at the odd-numbered and even-numbered pixel rows, the data lines $D_1$-$D_m$ and the gate lines $G_1$-$G_{2n}$ may be altered. The respective data lines are horizontally elongated roughly by one pixel, but may be elongated by two or more pixels. Moreover, as shown in FIG. 6, the extension pattern of the data line $D_p, D_{p+1}, \ldots$ is repeated per three pixel rows, but may be repeated per four or more pixel rows, depending upon the number of continuous horizontal extensions.

With the pixel arrangement shown in FIG. 6, the switching elements Q are formed closest to the data lines $D_p, D_{p+1}, \ldots$, and hence, the distance between the data line and the switching element Q at the neighboring gate lines as well as the formation area of the data lines $D_p, D_{p+1}, \ldots$ are reduced. In this way, the overlapped area of the data and the gate lines $D_p, D_{p+1}, \ldots$ and $G_{2k}, G_{2k+1}, \ldots$ is reduced so that the parasitic capacitance of the parasitic capacitor generated therebetween as well as the parasitic capacitance generated between the data line $D_p, D_{p+1}, \ldots$ and the LC layer 3 are reduced, thereby preventing the pixel voltage from being badly influenced.

Considering the neighboring red and green pixels R and G, the case where the data line $D_p, D_{p+1}, \ldots$ is present between the two pixels and the case where the data line is absent therebetween are alternately arranged in the row and column directions, the difference in the display area between the two pixels R and G is compensated for in the row and column directions, thereby reducing the defective vertical stripes.

Even in the structure shown in FIG. 6, the driver inversion is a column inversion, but four polarity types are sequentially repeated per four pixel rows, such as a positive (+) polarity column, a third mixed polarity column where both the negative (−) and the positive polarities are mixed in the column direction, a negative polarity column, and a fourth mixed polarity column where the positive and the negative polarities are mixed in the column direction. For instance, with the third mixed polarity column, the negative-the positive-the positive as a unit are repeated in the column direction, and with the fourth mixed polarity column, the positive-the negative-the negative as a unit are repeated in the column direction. In this way, the luminance difference made due to the kickback voltage between the case where the pixel voltage is positive and the case where it is negative is diffused so that the defective vertical stripes in the display image are reduced.

A pixel arrangement according to another embodiment of the present invention will be now explained with reference to FIG. 7.

Figure 7:
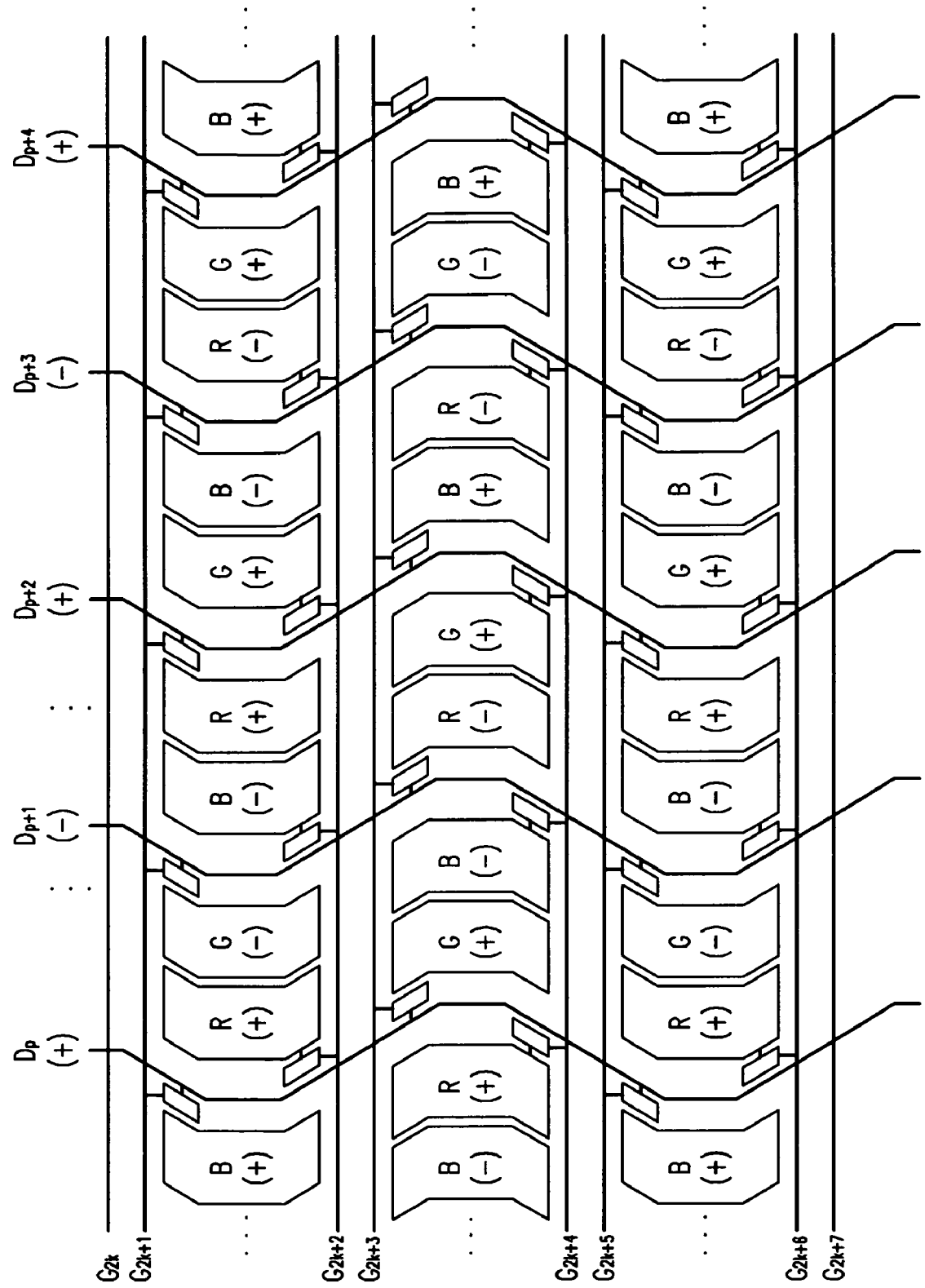
FIG. 7 illustrates an arrangement of pixels according to still another embodiment of the present invention.

FIG. 7 illustrates a pixel arrangement according to anther embodiment of the present invention.

An LCD with the pixel arrangement shown in FIG. 7 is based on the LCD shown in FIG. 1, but may be structured like the LCD shown in FIG. 5 or other different-structured LCDs. With the case illustrated in FIG. 5, the extension pattern of the data line $D_p, D_{p+1}, \ldots$ is repeated per three pixel rows.

As shown in FIG. 7, the pixel arrangement is the same as that illustrated in FIG. 3 except that the pixel electrode 190 is shaped with not a rectangle shape but a chevron shape, and the data line $D_p, D_{p+1}, \ldots$ vertically extended between the two neighboring gate lines is bent and elongated not horizontally but diagonally at 10-80° with respect to the line proceeding vertical to the gate line, followed by vertically extending between the two pixels neighboring to each other in the row direction. In the present embodiment, the inversion pattern the same as that shown in FIG. 3 is applied in FIG. 7 and detailed explanation will therefore be omitted. However, such a structure of the data line $D_p, D_{p+1}, \ldots$ may be applied to the pixel arrangements shown in FIGS. 4 and 6 as well as to other pixel arrangements.

With the pixel arrangement having such a pattern of the data line $D_p, D_{p+1}, \ldots$, the effect exerted due to the pixel arrangement shown in FIG. 3 is obtained, and furthermore, as any horizontally elongated portions are not existent between the two neighboring gate lines, the parasitic capacitance generated between the gate and the data lines can be significantly reduced. As the overlapped area of the data line $D_p, D_{p+1}, \ldots$ and the LC layer 3 is reduced so that the parasitic capacitance therebetween is decreased, and the bad influence with respect to the pixel voltage is prevented. Moreover, as any horizontally elongated portions are not existent between the two neighboring gate lines, the distance between the two neighboring gate lines is narrowed, and hence, the pixel aperture ratio is enhanced.

As described above, when the relative locations of the data line connected to the switching elements between the neighboring pixel rows are varied, the apparent inversion may be altered in various manners even when the driver inversion is a column inversion. Accordingly, the polarity of the data voltage is determined and applied from the data driver in the way of column inversion, the available material selection range for the data lines is widened, and the processing steps are easily simplified. As the apparent inversion is made in the mixed form of column inversion and dot inversion, the display image quality can be enhanced. Moreover, the number of data lines is reduced so that the number of high cost data driving circuit chips connected thereto is reduced, and the production cost of the display device can be significantly decreased.

Furthermore, the difference in the display area made between the data line formation region and the non-data line region is compensated for, the defective vertical stripes due to the display area difference are reduced so that the display image quality of the display device can be enhanced. Furthermore, the parasitic capacitance generated between the gate and the data lines as well as between the data line and the LC layer is reduced, thereby enhancing the display image quality.

Moreover, the deviation in the parasitic capacitance due to the misalignment of a mask generated during the processing is compensated for without forming a separate pattern so that the display image quality as well as the pixel aperture ratio are enhanced. Furthermore, with the usage of data lines bent and elongated not horizontally but diagonally between the two neighboring gate lines, any horizontally elongated data line portions are not existent between the two neighboring gate lines so that the distance between two gate lines can be narrowed, and the pixel aperture ratio can be enhanced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal panel assembly comprising:
a plurality of pixels arranged in the form of a matrix and each having a pixel electrode and a switching element connected to the pixel electrode;
a plurality of pairs of gate lines connected to the switching elements and extending in the row direction, each pair of the gate lines being connected to switching elements in a pixel row; and
a plurality of data lines connected to the switching elements and extending in the column direction, the data line being connected to the switching elements of the pixels in at least two adjacent pixel columns;
wherein the respective data lines are horizontally bent between the two adjacent gate lines associated with two adjacent pixel rows, and the polarities of the data voltages flowing through adjacent data lines are opposite to each other; and wherein with the apparent inversion of the pixels, polarity types of the pixels are altered per a plurality of the pixel columns.

2. The liquid crystal panel assembly of claim 1 wherein the respective data lines are bent and elongated between two adjacent gate lines in a first horizontal direction, and vertically extend between the two pixel columns, followed by being bent and elongated between two adjacent gate lines in a second horizontal direction.

3. The liquid crystal panel assembly of claim 2 wherein the first horizontal direction is opposite to the second horizontal direction.

4. The liquid crystal panel assembly of claim 3 wherein the respective data lines have an extension pattern repeated per two rows of the pixels.

5. The liquid crystal panel assembly of claim 3 wherein the respective data lines have an extension pattern repeated per three rows of the pixels.

6. The liquid crystal panel assembly of claim 3 wherein the respective data lines are elongated in the first horizontal direction or in the second horizontal direction by at least one pixel.

7. The liquid crystal panel assembly of claim 2 wherein the two pixels adjacent to each other in the row direction are connected to the same data line.

8. The liquid crystal panel assembly of claim 7 wherein the switching elements of the two pixels adjacent to each other in the row direction are located opposite to each other with respect to the pixel electrode.

9. The liquid crystal panel assembly of claim 8 wherein the two pixels arranged between the two adjacent data lines in the row direction ("the pixels as a unit pixel pair") are connected to different data lines.

10. The liquid crystal panel assembly of claim 9 wherein the pixels of the unit pixel pair are connected to different gate lines.

11. The liquid crystal panel assembly of claim 10 wherein the relative locations of the switching elements of the two unit pixel pairs adjacent to each other in the row direction are identical with each other.

12. The liquid crystal panel assembly of claim 10 wherein the switching elements of the two pixels adjacent to each other in the column direction are located opposite to each other with respect to the pixel electrode.

13. The liquid crystal panel assembly of claim 9 wherein the pixels of the unit pixel pair are connected to the same gate line.

14. The liquid crystal panel assembly of claim 13 wherein the switching elements of the two unit pixel pairs adjacent to each other in the row direction are located opposite to each other with respect to the pixel electrode.

15. The liquid crystal panel assembly of claim 13 wherein the switching elements of the two pixels adjacent to each other in the column direction are located opposite to each other with respect to the pixel electrode.

16. A liquid crystal panel assembly comprising:
a plurality of pixels arranged in the form of a matrix and each having a pixel electrode and a switching element connected to the pixel electrode;
a plurality of pairs of gate lines connected to the switching elements and extending in the row direction, each pair of the gate lines being connected to switching elements in a pixel row; and
a plurality of data lines connected to the switching elements and extending in the column direction, the data line being connected to the switching elements of the pixels in at least two adjacent pixel columns;
wherein the respective data lines are diagonally elongated, and the polarities of the data voltages flowing through adjacent data lines are opposite to each other; and wherein with the apparent inversion of the pixels, polarity types of the pixels are altered per a plurality of the pixel columns.

17. The liquid crystal panel assembly of claim 16 wherein the respective data lines are elongated in a first diagonal direction, followed by vertically extending between the two pixel columns, and elongated in a second diagonal direction.

18. The liquid crystal panel assembly of claim 17 wherein the first diagonal direction is opposite to the second diagonal direction.

19. The liquid crystal panel assembly of claim 18 wherein the first diagonal direction or the second diagonal direction is angled at 10-80.degree. with respect to a line proceeding vertical to the gate line.

20. The liquid crystal panel assembly of claim 19 wherein the respective data lines have an extension pattern repeated per two rows of the pixels.

21. The liquid crystal panel assembly of claim 20 wherein the respective data lines are elongated in the first diagonal direction or in the second diagonal direction by at least one pixel.

22. The liquid crystal panel assembly of claim 21 wherein the two pixels adjacent to each other in the row direction are connected to the same data line.

23. The liquid crystal panel assembly of claim 22 wherein the switching elements of the two pixels adjacent to each other in the row direction are located opposite to each other with respect to the pixel electrode.

24. The liquid crystal panel assembly of claim 23 wherein the two pixels arranged between the two adjacent data lines in the row direction ("the pixels as a unit pixel pair") are connected to different data lines.

25. The liquid crystal panel assembly of claim 24 wherein the relative locations of the switching elements of the two unit pixel pairs adjacent to each other in the row direction are identical with each other.

26. The liquid crystal panel assembly of claim 25 wherein the switching elements of the two pixels adjacent to each other in the column direction are located opposite to each other with respect to the pixel electrode.

27. A display device comprising:
a plurality of pixels arranged in the form of a matrix and each having a pixel electrode and a switching element connected to the pixel electrode;
a plurality of pairs of gate lines connected to the switching elements and extending in the row direction, each pair of the gate lines being connected to switching elements in a pixel row; and
a plurality of data lines connected to the switching elements via terminal lines and extending in the column direction, the data line being connected to the switching elements of the pixels in at least two adjacent pixel columns;
wherein the respective data lines are horizontally bent between the two adjacent gate lines, and the polarities of the data voltages flowing through the adjacent data lines are opposite to each other; and wherein with the apparent inversion of the pixels, polarity types of the pixels are altered per a plurality of the pixel columns.

28. The display device of claim 27 wherein with the apparent inversion of the pixels, the polarity types are altered per four of the pixel columns.

29. The display device of claim 28 wherein with the apparent inversion of the pixels, a positive (+) polarity column, a first mixed polarity column, a negative (−) polarity column, and a second mixed polarity column are repeated alternately.

30. The display device of claim 29 wherein with the first mixed polarity column and the second mixed polarity column, the negative polarity and the positive polarity alternate in the column direction, and the first mixed polarity column is opposite to the second mixed polarity column.

31. A display device comprising:
a plurality of pixels arranged in the form of a matrix and each having a pixel electrode and a switching element connected to the pixel electrode;
a plurality of pairs of gate lines connected to the switching elements and extending in the row direction, each pair of the gate lines being connected to switching elements in a pixel row; and
a plurality of data lines connected to the switching elements via terminal lines and extending in the column direction, the data line being connected to the switching elements of the pixels in at least two adjacent pixel columns;
wherein the respective data lines are diagonally elongated and the polarities of the data voltages flowing through the adjacent data lines are opposite to each other;
wherein with the apparent inversion of the pixels, polarity types are altered per a plurality of the pixel columns.

32. The display device of claim 31 wherein with the apparent inversion of the pixels, the polarity types are altered per four of the pixel columns.

33. The display device of claim 32 wherein with the apparent inversion of the pixels, a positive (+) polarity column, a first mixed polarity column, a negative (−) polarity column and a second mixed polarity column are repeated alternately.

34. The display device of claim 33 wherein with the first mixed polarity column and the second mixed polarity column, the negative polarity and the positive polarity alternate in the column direction, and the first mixed polarity column is opposite to the second mixed polarity column.

35. A liquid crystal panel assembly comprising:
a plurality of pixels arranged in the form of a matrix and each having a pixel electrode and a switching element connected to the pixel electrode;
a plurality of pairs of gate lines connected to the switching elements and extending in the row direction, each pair of the gate lines being connected to switching elements in a pixel row; and
a plurality of data lines connected to the switching elements and extending in the column direction, the data line being connected to the switching elements of the pixels in at least two adjacent pixel columns;
wherein the respective data lines are horizontally bent between the two adjacent gate lines associated with two adjacent pixel rows, and
wherein the respective data lines are bent and elongated between two adjacent gate lines in a first horizontal direction, and vertically extend between the two adjacent pixel columns, followed by being bent and elongated between two adjacent gate lines in a second horizontal direction, and
wherein the two pixels adjacent to each other in the row direction are connected to the same data line, and
wherein the switching elements of the two pixels adjacent to each other in the row direction are located opposite to each other with respect to the pixel electrode, and
wherein the two pixels arranged between the two adjacent data lines in the row direction ("the pixels as a unit pixel pair") are connected to different data lines, and wherein the pixels of the unit pixel pair are connected to the same gate line.

36. The liquid crystal panel assembly of claim 35 wherein the switching elements of the two unit pixel pairs adjacent to each other in the row direction are located opposite to each other with respect to the pixel electrode.

37. The liquid crystal panel assembly of claim 35 wherein the switching elements of the two pixels adjacent to each other in the column direction are located opposite to each other with respect to the pixel electrode.

* * * * *